United States Patent [19]

Klein

[11] Patent Number: 4,893,488

[45] Date of Patent: Jan. 16, 1990

[54] MODULAR COMMUNICATIONS SOCKET LOCK

[76] Inventor: Edward Klein, 2 Professional Dr., Ste. 232, Gaitherburg, Md. 20879

[21] Appl. No.: 318,013

[22] Filed: Mar. 2, 1989

[51] Int. Cl.$^4$ ............................................. E05B 73/00
[52] U.S. Cl. ..................................... 70/360; 439/133; 70/14; 70/57
[58] Field of Search ....................... 70/57, 58, 14, 360; 439/133; 379/443, 445

[56] References Cited

U.S. PATENT DOCUMENTS

| | | | |
|---|---|---|---|
| 4,311,883 | 1/1982 | Kidney | 439/133 |
| 4,740,168 | 4/1988 | Carney | 439/133 |

FOREIGN PATENT DOCUMENTS 1167935  4/1964  Fed. Rep. of Germany ...... 439/133

Primary Examiner—Robert L. Wolfe

[57] ABSTRACT

A device for locking and unlocking an unused modular communications socket to prevent unauthorized use of said socket when desired. This modular socket may be a connection to telephone line, or part of equipment which commonly uses said modular jack such as a telephone, computer modem, or fax machine. Said device consists of a sliding bolt lock in a casing, said casing being dimensioned to slide into modular socket when in unlocked position. When device is locked, sliding bolt partially protrudes from casing and engages retention lip of modular socket preventing removal of said device while locked. A removable key is used to open and close said device, and device may be unlocked and removed by repositioning bolt into casing with key mechanism. In previous design of modular jack lock, a standard communication plug with leaf spring is inserted into modular jack, and device was made to inclose said spring in lock casing so that a key mechanism would cause compression of said spring in casing allowing for removal of said plug from modular jack. Another previous design of a modular jack lock has a sliding wedge positioned in a manner that prevents compression of leaf spring of plug preventing removal of plug from socket. Another previous design of a socket lock is a one time closure device; locking an attached device to a communication socket while device is still usable, preventing theft of attached device. As will be shown in more detail in the following descriptions, this device does not require a leaf spring as used in previous designs of socket locks, and would be more compact, more durable, and less expensive to produce than previous communication socket locks.

7 Claims, 1 Drawing Sheet

MODULAR COMMUNICATIONS SOCKET LOCK

SUMMARY OF INVENTION

A device for locking and unlocking an unused modular communications socket to prevent unauthorized use of said socket when desired. This modular socket may be a connection to telephone line, or part of equipment which commonly uses said modular jack such as a telephone, computer modem, or fax machine. Said device consists of a sliding bolt lock in a casing, said casing being dimensioned to slide into modular socket when in unlocked position. When device is locked, sliding bolt partially protrudes from casing and engages retention lip of modular socket preventing removal of said device while locked. A removable key is used to open and close said device, and device may be unlocked and removed by repositioning bolt into casing with key mechanism. In previous design of modular jack lock, a standard communication plug with leaf spring is inserted into modular jack, and device was made to inclose said spring in lock casing so that a key mechanism would cause compression of said spring in casing allowing for removal of said plug from modular jack. Another previous design of a modular jack lock has a sliding wedge positioned in a manner that prevents compression of leaf spring of plug preventing removal of plug from socket. Another previous design of a socket lock is a one time closure device; locking an attached device to a communication socket while device is still usable, preventing theft of attached device. As will be shown in more detail in the following descriptions, this device does not require a leaf spring as used in previous designs of socket locks, and would be more compact, more durable, and less expensive to produce than previous communication socket locks.

DETAILED DESCRIPTION OF DEVICE

Figure 1:
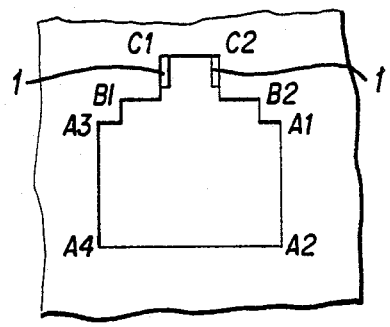
FIG. 1 is a front view of a modular communication socket
Figure 2:
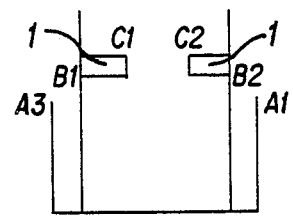
FIG. 2 is a view of modular communication socket looking out from rear of socket

In FIG. 1, a modular communication socket is showed, this socket is used for connecting communication devices such as a telephone to the wires supplied by the phone company, or may be used in equipment such as a telephone, fax machine, answering machine, or computer modem. For description purposes I have divided the front view of the socket into different rectangles by placing letters and numbers at different points. The rectangle formed by A1-A2-A3-A4 are the dimensions that the modular communication socket lock is designed to fit into, extending near but not touching back of socket. The width of the socket from B1 to B2 is the approximate width of the sliding bolt in lock casing. The width of socket C1 to C2 opens to the width of B1-B2 after passing the retention shoulder of socket(1) as shown in diagram 2, and maintains that minimum width of B1-B2 the entire length of socket after passing retention shoulder(1).

Figure 3:
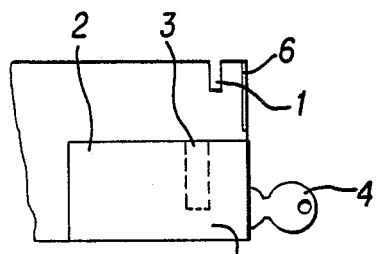
FIG. 3 is a cut away side view of device in communication socket, bolt completely in casing(unlocked position)
Figure 4:
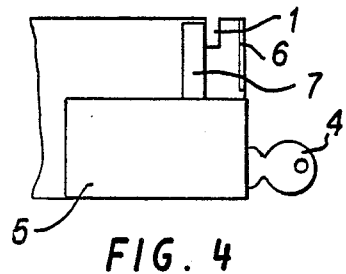
FIG. 4 is a cut away side view of device in communication socket, bolt positioned partially out of casing engaging retention shoulder

As shown in FIG. 3, the casing of modular communicaiton socket lock is dimensioned to fit closely to the internal lower section of socket, A1-A2-A3-A4, said casing(2) when inserted into socket has sliding bolt(7) retracted in casing so that bolt channel(3) is positioned posterior to retention shoulder(1). The socket lock(5) has a flange(6) which covers the rest of socket while socket lock is inserted into socket. After the socket lock is placed inside communication socket, key(4) is turned causing sliding bolt(7) to partially protrude through bolt channel(3), and be positioned posterior to retention shoulder(1) of socket, preventing removal of said device from modular socket. Bolt(7) is in close proximity to the inside top wall of socket and extends in width from B1 to B2. Key(4) can then be removed and the socket is rendered useless by said device. By turning the key in opposite direction the bolt is repositioned into casing and the lock may be removed from the socket.

Figure 5:
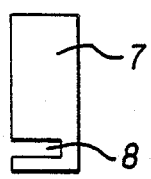
FIG. 5 is a front view of sliding bolt
Figure 6:
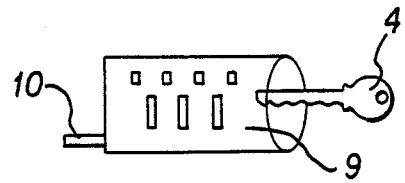
FIG. 6 is a side view of internal locking mechanism
Figure 7:
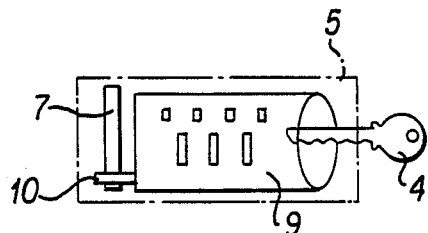
FIG. 7 is a cut away side view of locking mechanism bolt in casing (unlocked position)
Figure 8:
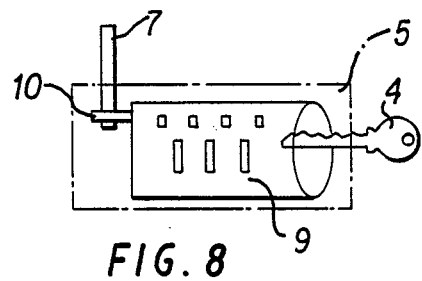
FIG. 8 is a cut away side view of locking mechanism bolt positioned partially out of casing(locking position).

In FIG. 5, a front view of bolt(7) is shown with its bolt groove(8). This groove is engaged by bolt nut(10) of a lock tumber mechanism(9), as shown in FIG. 7. When key(4) is rotated in a clockwise direction, bolt nub(10) engaged in bolt groove(8) rotates in a clockwise direction to position as shown in FIG. 8. Sliding bolt(7) is forced upward by bolt hub(10) and is positioned outside of casing and locked in such position. By rotation of key in counter clockwise direction, the bolt is withdrwan into casing as shown in FIG. 7.

These diagrams and description of modular communications socket lock show a sliding bolt locking mechanism used to cause a sliding bolt to be positioned posterior to retention shoulder of communication socket. It is obvious that many different types of internal locking mechanisms could be used to achieve the same result, and not differ from the original spirit of this invention.

I claim:

1. A device for locking and unlocking an unused modular communications socket, said device comprising a locking mechanism entirely inclosed in casing while in the unlocked position, said casing dimensioned to fit said communications socket and having opening in said casing positioned to allow sliding bolt mechanism to protrude from said opening in casing posterior to retention shoulder of said communications socket, preventing removal of said device in locked position, and allowing for unlocking of said device by repositioning bolt inside of casing allowing for the removal of said device from modular socket.

2. The device in claim 1 in which locking mechanism is a key and tumbler type locking mechanism.

3. Device as in claim 1 which is adapted to fit modular communication socket of telephone line wall outlet.

4. Device as in claim 1 which is adapted to fit modular communication socket of computer modem.

5. Device as in claim 1 which is adapted to fit modular communication socket of fax machine.

6. Device as in claim 1 which is adapted to fit modular communication socket of telephone answering machine.

7. Device as in claim 1 which is adapted to fit modular communication socket of telephone.

* * * * *